No. 877,986. PATENTED FEB. 4, 1908.
L. H. DAVIS.
TRUSS.
APPLICATION FILED MAY 14, 1906.

2 SHEETS—SHEET 1.

WITNESSES
H. A. Lamb.
J. H. McNamara

INVENTOR
Luman H. Davis.
BY Geo. O. Phillips.
his ATTORNEY

No. 877,986. PATENTED FEB. 4, 1908.
L. H. DAVIS.
TRUSS.
APPLICATION FILED MAY 14, 1906.
2 SHEETS—SHEET 2.
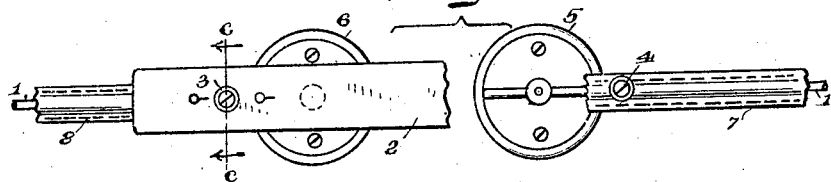
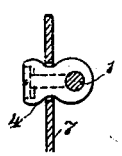
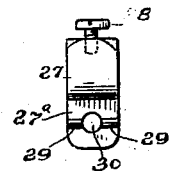
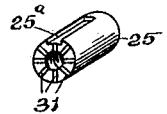
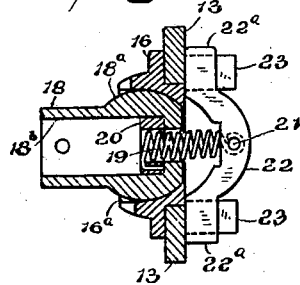
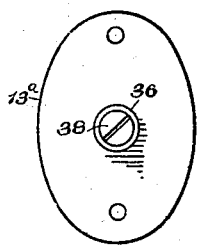
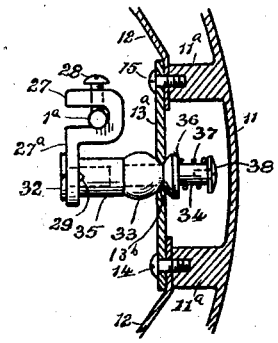
WITNESSES
H. A. Lamb.
J. H. McNamara
INVENTOR.
Luman H. Davis
BY Geo. D. Phillips.
his ATTORNEY.

UNITED STATES PATENT OFFICE.

LUMAN H. DAVIS, OF BRIDGEPORT, CONNECTICUT.

TRUSS.

No. 877,986.   Specification of Letters Patent.   Patented Feb. 4, 1908.

Application filed May 14, 1906. Serial No. 316,668.

*To all whom it may concern:*

Be it known that I, LUMAN H. DAVIS, a citizen of the United States, and a resident of Bridgeport, in the county of Fairfield and State of Connecticut, have invented certain new and useful Improvement in Trusses, of which the following is a specification.

My invention relates to trusses; and it has for its object to provide certain improvements in trusses employed for the retention and cure of hernia.

Figure 1:
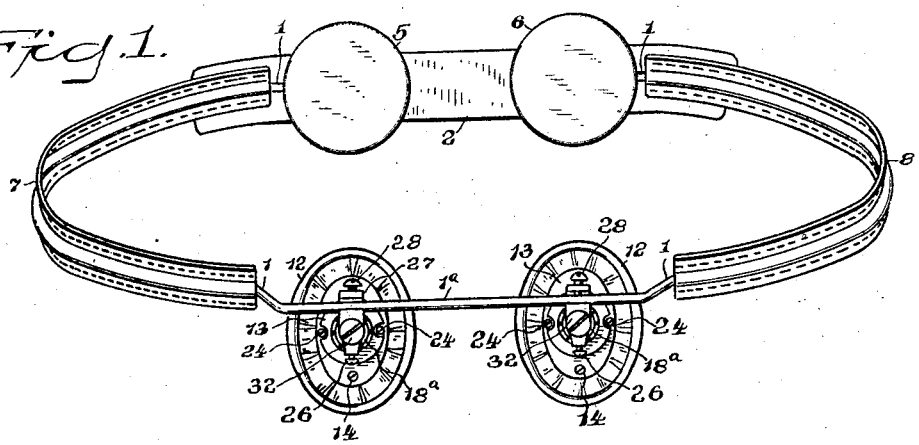
Figure 2:
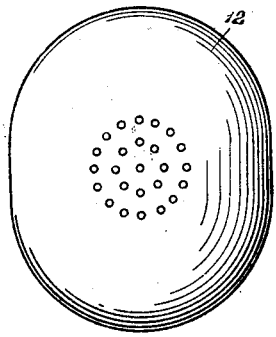
Figure 3:
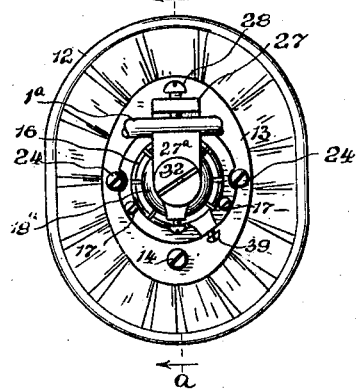
Figure 4:
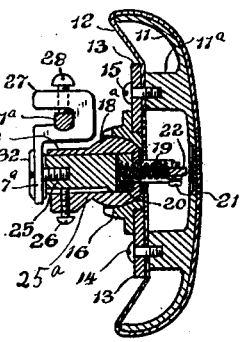
Figure 5:
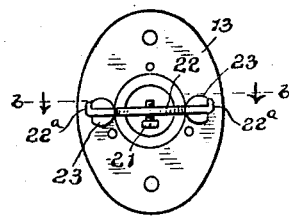
Figure 7:
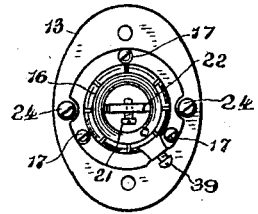
Figure 6:
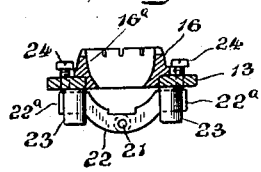

To enable others to understand my invention reference is had to the accompanying drawings in which Figure 1 represents a view in perspective of the truss: Fig. 2— is an enlarged detail view of the inside face of the pads: Fig. 3— is an enlarged detail reverse or outer face of one of the pads, and a broken section of the body wire secured therein: Fig. 4— is an enlarged detail sectional view of one of the pads on line $a$ of Fig. 3: Fig. 5— is an enlarged detail view of the inside face of one of the pad-plates: Fig. 6— is a detail sectional view of the pad-plate on line $b$ of Fig. 5: Fig. 7— is an enlarged detail view of the outer face of one of the pad-plates: Fig. 8— is broken view of the rear part of the truss showing the back pads in elevation: Fig. 9— is a cross section on line $c$ of Fig. 8: Fig. 10— is an enlarged detail inner view of one of the pad-clamps: Fig. 11— is an enlarged detail perspective view of the adjustable pad support: Fig. 12— is an enlarged cross sectional view of the pad-plate and ball and socket connection attached thereto; Fig. 13— is an enlarged detail elevation of a pad-plate showing a modification of the ball and socket connection: Fig. 14— is an enlarged side view of a modification of the ball and socket connection and broken central sectional view of the pad and pad-plate connected therewith.

The double padded truss shown at Fig. 1 comprises the body wire 1 made preferably of steel shaped to fit the body and tempered to retain its form. The body wire is open at the back and the space between the free ends of the wire is bridged by the strap 2, see also Fig. 8, adjustably and detachably secured to the studs 3 and 4, which studs are adjustably secured to the wire and near its free ends.

5 and 6 are the back pads adapted to have a vertical tilting movement on the body wire.

7 and 8 are side coverings made of leather, fabric or other like non heat radiating material, and are free to turn on the wire and thus accommodate themselves to the body in all its varied and changing positions and thus prevent chafing or otherwise irritating the skin.

9 and 10 are the hernia-pads located on the offset portion $1^a$ of the body-wire. As these pads and their mechanism are exactly alike, the same reference figures will answer for both.

Referring to Fig. 4, 11 is the cup-shaped metal pad having the leather covering 12 embracing the outer or convex metal portion and extending within the concave portion, shown also at Fig. 3, and resting on the studs $11^a$, and held firmly thereto by means of the metal plate 13 and the screws 14 and 15.

16 is a ball socket, see also Figs. 1, 6, 7 and 12, let into and secured to the plate 13 by the screws 17.

18 is a shell having the ball $18^a$ at its inner end adapted to rest in the ball socket $16^a$ of the plate 16, and it is operatively retained therein as follows: 19, see particularly Fig. 12, is a spring having one end anchored to the round button or block 20 located at the bottom of the recess $18^b$ of the shell 18. The inner end of the spring 19 is attached to the screw 21 located in the support 22 operatively mounted in the forked studs 23, Fig. 5, projecting from the inner face of the plate 13. The angularly bent ends $22^a$ of said adjustable spring support effectually prevents its lateral displacement.

24, Fig. 6, are screws extending through the plate 13 whose points engage the support 22 to adjust said sppport to and from the plate 13 and thereby increase or decrease the tension of the spring 19 and, consequently, impart greater or less rigidity to the ball and socket connection.

25, Figs. 4 and 11, is an adjustable pad support adapted to be mounted in the recess $18^b$, Fig. 12, and secured in any of its adjustable positions by the screw 26 whose point engages the recess $25^a$ of said support. The recess $25^a$ and the screw 26 will prevent rotation of the support and, at the same time, enable it to be longitudinally adjusted for the purpose presently to be described.

27, Figs. 3, 4 and 10, is an open mouth clamp adapted to embrace the off-set portion $1^a$ of the truss or body wire and is adjustably secured thereto by the set-screw 28. The tail-piece $27^a$ is adjustably secured to the outer end of the pad support 25 as follows: On the inner face of said tail-piece are the projections 29 located on each side of the screw hole 30, which projections are adapted to enter any of the radial slots 31, Fig. 11, in the outer end of the support 25 and be temporarily secured therein by the screw 32.

The pads can, as before mentioned, be placed in the most favorable position on the wire extension 1ª to properly support the rupture. When the pad is in the proper position over the rupture, it is adjusted toward the body, not shown, to give the necessary amount of pressure by loosening the screw 26 and withdrawing the pad support 25, and when the right pressure is attained said support is secured in place. Previous, however, to the operation just described, and if required, the pad may be rotated into any position best suited to bear upon the rupture by loosening the screw 32 and adjusting the projections 29 of the clamp 27 into any of the radial slots 31 of the pad support 25.

The construction above described makes the truss automatic in its operations in view of that fact that the pad will readily accommodate itself to every movement of the body by reason of the ball and socket connection and the tension spring 19. Where both pads are used as in a double rupture, the adjustable feature of the pad support 25 enables a greater pressure to be put on one pad than on the other.

The modified construction of the ball bearing shown at Figs. 13 and 14, consists of the plate 13ª having a concave seat 13ᵇ, in its outer face to receive the ball 33, mounted on the extension 34, integral with the clamp support 35. 36 is a ball faced collar freely mounted on the extension 34 adapted to engage the concave seat in the plate 13ª, and 37 is a spring located between the straight face of the collar 36 and the screw 38 to preserve the contact of the ball and socket connection so that, when the pad is deflected from its normal position by the motion of the wearer's body, the spring will resist such pressure and restore the pad to its normal position the instant the pressure is removed.

In some cases it is advisable to secure the pad in a certain fixed position. For this purpose, the set-screw 39, Figs. 3 and 7, projects through the ball-socket 16 to engage with the ball 18ª.

Having thus described my invention what I claim as new and desire to secure by Letters Patent is:

1. In a truss, a concavo convex pad, studs projecting from the concave surface and integral therewith, a plate secured to the studs, a non metallic covering for the pad and secured between the plate and studs, a ball-socket secured to the plate, a shell, a ball on its end to rest in said socket, a spring in axial alinement with the ball with one end secured within said ball, adjustable means outside of said ball to engage the other end of said spring, a body wire, a clamp removably and adjustably secured thereto, a longitudinal pad support adjustably mounted in the shell, and means for connecting said clamp thereto, for the purpose set forth.

2. In a truss, a concavo convex pad, studs projecting from the concave surface and integral therewith, a plate secured thereto, a ball-socket secured to said plate, a ball mounted in the socket, a spring in axial alinement with the ball and projecting through the plate, a support for the outer end of the spring, means for adjusting said support to regulate the tension of the spring, and means to prevent lateral displacement of said spring support, for the purpose set forth.

3. In a truss, a pad, a plate secured to its outer surface, a ball-socket secured to said plate, a shell having on one end a ball to rest in said socket, said ball having a central hole therethrough, a tension spring projecting through said hole and secured at one end within the ball, forked studs on the plate, a spring support mounted therein to be engaged by the outer end of the spring, means for adjusting said spring support to regulate the tension of the spring, a body wire, a clamp adjustably and removably secured thereto, a pad support having a longitudinal adjustment in the shell, means for securing the clamp thereto, for the purpose set forth.

4. In a truss, a pad, a plate secured to its outer surface, a ball-socket on the outside of the plate, an open mouth shell having a ball to engage with said socket, a spring in axial alinement with the ball with one end secured within the ball, an adjustable spring support to which the opposite end of said spring is connected, means for adjusting said support to regulate the tension of the spring, a body wire, an open mouth clamp adjustably secured thereto, a pad-support having a longitudinal adjustment in the shell, means to prevent its rotation, means for securing the clamp to the pad-support, and means on said clamp and the outer end of the clamp-support to secure the pad in any of its rotatable positions, for the purpose set forth.

Signed at Bridgeport in the county of Fairfield and State of Connecticut this 28th day of April, A. D. 1906.

LUMAN H. DAVIS.

Witnesses:
GEORGE W. FINN,
A. K. LOVELL.